United States Patent Office 3,746,608
Patented July 17, 1973

3,746,608
SHAPED ARTICLE OF SYNTHETIC RESIN HAVING MECHANICALLY DISORDERED ORIENTATION
Mitsuhiro Takahashi, Fukushima-ken, Japan, assignor to Nitto Boseki Co., Ltd., Fukushima-shi, Japan
Application May 26, 1969, Ser. No. 834,582, which is a continuation of abandoned application Ser. No. 366,244, May 11, 1964. Divided and this application Sept. 17, 1971, Ser. No. 181,304
Claims priority, application Japan, May 14, 1963, 38/24,051
Int. Cl. B32b 3/00
U.S. Cl. 161—116                            4 Claims

ABSTRACT OF THE DISCLOSURE

A strapping band having improved resistance to splitting is produced by melt extrusion of a thermoplastic synthetic resin followed by stretching whereby the band is oriented in the longitudinal direction and given strength in that direction, followed by subjecting thus oriented band to compression by rollers having indentations on their surface to form a multitude of indentations throughout the surface of the band, whereby the orientation is partially disordered and the strength of the band in the axis perpendicular to the extrusion axis is greatly improved.

---

Figure 1:
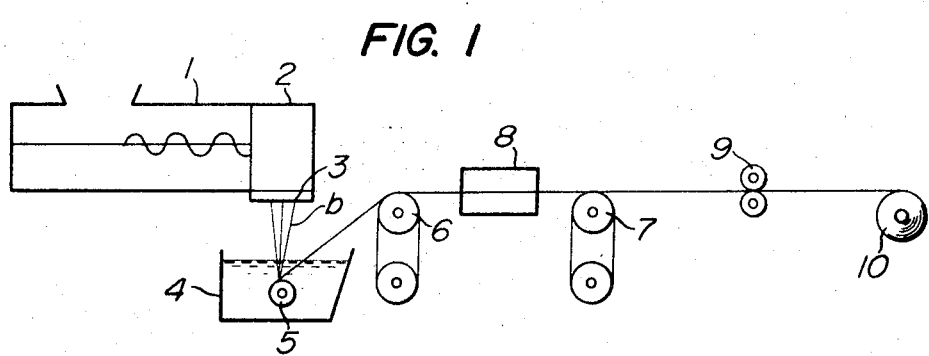

This application is a division of application Ser. No. 834,582 filed May 26, 1969, which, in turn, is a continuation of application Ser. No. 366,244 filed May 11, 1964, now abandoned.

This invention relates to shaped articles of thermoplastic synthetic resins having molecular orientation disordered by mechanical means and to methods for producing the same.

In one aspect, this invention relates to shaped articles of one or more thermoplastic synthetic resins which are produced by melt extrusion, followed by stretching, but wherein the arrangements of their molecular orientations are disordered to a certain extent by mechanical treatment and to methods for producing the same shaped articles.

Shaped articles of thermoplastic synthetic resins produced by the customary melt extrusion process, followed by stretching have a monotonous, smooth outer surface and stiff touch. Whether they are formed in the shape of sheet film, band, tape or monofilament, does not matter. They have all these properties. When they are in such shapes, they have the further disadvantage that their softness, breaking strength and impact strength are not satisfactory. For example, this fact can be readily understood when a nylon extruded sheet is compared with a nylon woven fabric. The former has a monotonous, smooth outer surface and stiff touch, whereas the latter has a complicated outer surface and soft touch due to its structure composed of a great number of thin filaments. Further, such oriented extrudates have increased strength in the direction of their extrusion axis but the strength in the direction perpendicular to the extrusion axis is much decreased. Accordingly, when such shaped articles are brought under forces exerted in the direction perpendicular to the extrusion axis, they are liable to split. When bands of extruded thermoplastic synthetic resin are to be used for binding parcels or the like, the slip which occurs between bands due to their smooth surface and the split which occurs in the longitudinal direction become almost fatal drawbacks. Accordingly, it would be very desirable to provide oriented extrudates of thermoplastic synthetic resin with fabric-like surface and soft touch by a mechanical means which is not so complicated as the processing of fabrics consisting of spinning, weaving, etc.

It is an object of the present invention to provide shaped articles of thermoplastic resin having relatively complicated outer surfaces and a soft touch like spun woven fabrics by mechanical means which are much simpler than processing of fabrics. It is another object of the present invention to provide shaped articles of thermoplastic synthetic resins having softness, breaking strength and impact strength higher than simply extruded and stretched articles. Yet another object of the present invention is to provide bands of thermoplastic synthetic resins which do not slip between each other, do not split in the longitudinal direction, and are suitable for binding parcels.

Still another object of the present invention is to provide methods for producing shaped articles of thermoplastic synthetic resins having the above-mentioned properties.

Other objects and advantages will be apparent to one skilled in the art upon a study of this disclosure including the detailed description of the invention and the claims.

According to the present invention, shaped articles of thermoplastic synthetic resins which are produced by melt spinning and subsequent stretching are brought under controlled mechanical action such as pressing by grooved rollers, bending by the biting of gears, and beating with hammers to cause disorder of molecular orientation and thereby provide the shaped articles with handle or touch like non-woven fabric. The effect of non-woven-fabric-like handle or touch on tapes, ropes or the like by disordering molecular orientation can be produced readily and most efficiently by extruding a blend of more than one high molecular compound having fiber-forming capability but having different crystal cycles, phases or the like through nozzles in the molten state to form bonding between the extruded shapes. The resulting shaped articles such as tapes, ropes or the like appear to be forming one body because of the loose electrostatic binding force but their arrangement can be readily disordered by applying mechanical treatment such as compression, friction, twisting or the like while retaining some degree of the binding state by which non-woven-fabric-like handle or touch can be produced on the shaped articles such as tapes, ropes or the like.

Though high molecular compounds having fiber-forming capability are brought into crystalline state by orientation stretching, their fiber cycles are different according to the substance. For example, fiber cycles of thermoplastic synthetic resin are as follows: Polyethylene—2.53 A.; isotactic polypropylene—6.50 A.; polyethylene terephthalate—10.75 A.; nylon 6—17.2 A.; nylon 66—17.2 A. When the fiber cycles of two substances are the same, or in the relation of a multiple, the binding of two substances is strong. For example the binding of nylon 6 with nylon 66 is strong, but the binding of polyethylene with polypropylene is weak because of the discrepancy of the cycles. In the combination of weak binding, the molecular orientation is readily disordered by mechanical means. The effectiveness of disordering treatment is dependent not only upon the combination but also upon the mixing ratio. For example, in the combination between polyethylene and polypropylene, there is a range in which the molecular orientation can readily be disordered, in from 20–15% of the polyethylene and from 80–85% isotactic polypropylene and in from 20–15% of isotactic polypropylene and from 80–85% of polyethylene.

It is possible to obtain shaped articles having various characteristic properties according to the kind and ratio of blended high molecular weight polymers. Shaped articles of the present invention having unique properties quite different from conventional extrudates are produced by an extremely simple mechanical means. Simplicity of processing is particularly attractive when the production efficiency must be considered in large scale production. In this regard, the shaped articles of the present invention have a promising future in various fields of application. By utilizing their unique properties such as softness, tenacity and resistance to corrosion, they can be used in packaging materials such as packaging nets, ropes, and strings, fishing materials such as enclosing nets or other kinds of net, and ropes or hanging wire for pearl raising, apparel material, carpet material and as a substitute for non-woven fabric.

The foregoing advantage of the present invention, particularly when a blend of thermoplastic synthetic resins is used, will be explained by taking up the case of 80% by weight of isotactic polypropylene and 20% by weight of high density polyethylene. A molten mixture of 80% by weight of isotactic polypropylene and 20% by weight of high density polyethylene are extruded from a nozzle having a definite shape. After being quenched in water, a band shaped article is stretched at a definite stretch ratio and its surface is subsequently pressed partly by rollers having a great number of indentations on the surface by which a disordered shaped article having copied indentations on the surface is obtained. Resulting band-shaped articles have soft handle or touch. Their characteristic properties can be considered to lie between that of extrudates of synthetic resin and that of fabrics woven from spun yarns. Such a band having a total denier of 40,000, a width of 15.5 millimeter and a thickness of 0.4 millimeter showed in one example a breaking strength of 160 kg., a breaking elongation of 20% and a hooked breaking strength of 200 kg.

Shaped articles having the above-mentioned composition, i.e. 20% by weight of polyethylene and 80% by weight of polypropylene, are softer than shaped articles of a single substance, e.g. isotactic polypropylene not only in appearance, but also in actual properties. This is due to the fact that the former is more readily disordered than the latter. This can be observed numerically by the increase of hooked breaking strength as shown in the following Table 1.

TABLE 1

|  | Breaking strength, g./de. | Breaking elongation, percent | Hooked breaking strength, g./de. |
| --- | --- | --- | --- |
| Isotactic polypropylene | 3.7 | 23 | 3.1 |
| Polyethylene plus polypropylene | 4.0 | 20 | 5 |

Due to the increased softness, the absolute value of hardness and its temperature dependency is smaller in the case of a blend than in the case of a single substance as shown in the following Table 2.

TABLE 2

|  | Unit, kg./mm.² | | | | | |
| --- | --- | --- | --- | --- | --- | --- |
| Temperature | −20 | −10 | 0 | +10 | +20 | +30 |
| Isotactic polypropylene | 580 | 472 | 445 | 346 | 315 | 274 |
| Polyethylene plus polypropylene | 304 | 280 | 262 | 214 | 200 | 178 |

In simpler cases of application, such as packing bands or the like, the shaped articles of the present invention can be produced using a single substance without resort to extrudates of blends. Though it is simpler, as a method, it must be understood that it is also in the scope of the present invention because the object, means and effect of the invention are the same.

According to the present invention, in producing packaging bands, after being extruded and stretched, the thermoplastic synthetic resin extrudates are compressed by two rollers having surfaces of convex and concave parts thereby to form convex and concave copy on the surface. By the compression of the convex part of the rollers, the extrudates having longitudinal orientation are subjected to the component of force perpendicular to the axis of extrusion, whereby there is produced molecular orientation also in the direction perpendicular to the axis of extrusion and the strength in that direction is thus increased. By the mutual biting of convex and concave parts, and the increase of contact surface area, the slip of each extrudate can be greatly reduced. This is also advantageous in preventing slip between each packed and bound parcel. The increased strength in the direction perpendicular to the axis of extrusion is very effective in preventing longitudinal split.

Figure 2:
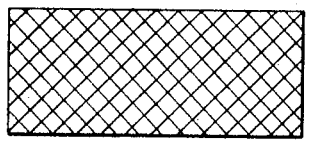
Figure 3:
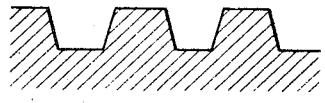

Packaging bands of the present invention can be more fully understood by referring to the drawing. FIG. 1 is a schematic view of the method of the present invention; FIG. 2 is a vertical plan view of a compressing roller having diagonal indentations in two directions, and FIG. 3 is an enlarged side view of one surface part of the roller. Reference is made to the drawing in detail, and to FIG. 1, in particular, wherein a molten polymer contained in a cylinder 2 of an extruder 1 passes through a die 3 which optionally may contain a plurality of holes. The extruded band b passes under a guide 5 in a cooling bath 4. The cooled band passes from bath 4 over and around nip rolls 6. At an appropriate distance from the nip rolls, there are positioned stretching rolls 7. Between these two pairs of rolls 6 and 7, a heating apparatus 8 having a circulation of hot air, steam or the like, heats the band so it will be well oriented in the direction of the axis of extrusion. The band, subsequently, passes under a pair of compression rollers 9 to wind-up roll 10. In this instance, the two compression rollers 9 have two sets of spiral indentations on their surfaces as shown in FIG. 2 in two directions, the cross section of which are of trapezoid configuration. As the spiral pitches of the two rollers are not identical, the parts which have contacted with the convex parts of the two rollers are subjected to the strongest compression, thereby to form convex and concave pattern of random arrangement. It is preferable that the compression pressure upon the band is 5 kg./mm.², the velocity of passage is in the range of from 40 m./min. to 150 m./min., and the degree of stretch is in the range of from 15–100%, most preferably about 20%.

In order that those skilled in the art may more fully understand the nature of the present invention and the method of carrying it out, the following examples are given, but it will be understood that the examples are merely illustrative and not intended to limit the scope of the invention unless otherwise indicated.

EXAMPLE 1

85% by weight of high density polyethylene and 15% by weight of isotactic polypropylene were admixed and brought into the molten state in a conventional screw type extruder having 60 mm. diameter. The maximum temperature at the melting zone was 260° C. The molten polymer was extruded from a die having a length of 12 centimeters and a width of 0.5 millimeter placed at the end of the extruder. The extrudate from the die was immediately cooled by water and stretched to 8 times the original length in hot water at 95° C. by use of a drawing apparatus whereby a band shaped product was obtained. By use of a pair of compression rollers having indentations on the surface, a band shaped product having disordered orientation was obtained. The product had a denier of 52,000, a breaking strength of 4.1 g./de., an elongation of 19%, and a hooked strength of 5.3 g./de.

EXAMPLE 2

75% by weight of high density polyethylene and 25% by weight of polyamide were admixed and brought into the molten state in a 115 millimeter-diameter screw type extruder. The maximum temperature at the melting zone was 290° C. The molten blend was extruded from a T-shaped die which is placed at the end of the extruder and had a width of 105 centimeters, cooled by water in a cooling bath and stretched to 5 times the original length by a drawing apparatus. By use of five pairs of rollers having indentations on the surfaces, and passing through a guide, a band shaped product having a width of 20 centimeters and disordered orientation was wound by a take-up device in the slightly twisted state. The resulting shaped product had a weight of 20.5 g. per meter, a tensile strength of 720 kg. and an elongation of 24%.

EXAMPLE 3

50% by weight of high density polyethylene, 35% by weight of isotactic polypropylene and 15% by weight of polyethylene terephthalate were admixed and brought into the molten state in a 60 millimeter-diameter screw type extruder. The maximum temperature at the melting zone was 260° C. The molten blend was extruded from a slit which was fixed at the end of the extruder, had 15 holes, and was 0.4 millimeter in width and 7 millimeters in length. After being cooled by water, and stretched to 8.0 times the original length at a temperature of 105° C. by steam, the extrudate was compressed by 5 pairs of rollers having indentations. The diameters of the rollers were made so as to increase gradually from the inlet side to outlet side, by which the increase of peripherical speed, i.e., the stretching was effected by 10%. The resulting tape-shaped product had a denier of 4500, a width of 4.5 millimeters, a dry strength of 5.3 g./de., an elongation of 17.5% and a knot strength of 4.3 g./de.

EXAMPLE 4

Isotactic polypropylene was brought into the molten state by a screw type extruder of 60 millimeter diameter. The maximum temperature of its heating zone was 270° C. The band-shaped extrudate from a nozzle attached at the end of the extruder was cooled by water in a cooling bath, and stretched to 5.5 times its original length in hot water heated at a temperature of 95° C. After being dried, the stretched extrudate was wound by a take-up device while passing through a compression apparatus, whereby a band of 16 millimeters in width and 0.31 millimeter in thickness, and 4.5 g. in weight per meter was obtained.

Its breaking strength and elongation at break were 110 kg. and 29% respectively. Its knot strength showed 80 kg., whereas the knot strength of a band having a smooth surface and being produced by the same condition except the compression treatment was only 40 kg.

EXAMPLE 5

High density polyethylene containing 5 weight percent diphenyl chloride as a plasticizer was brought into the molten state by a 60 millimeter diameter screw type extruder. The maximum temperature of the melting zone was 280° C. The band-shaped extrudate from a nozzle attached at the end of the extruder was cooled by water in a cooling bath and stretched to 6.8 times its original length in hot water heated at a temperature of 95° C. After being dried, the stretched extrudate was wound by a take-up device while passing through a compression apparatus whereby a band of 15 millimeters in width and 0.4 millimeter in thickness and 5.5 g. in weight per meter was obtained. Its breaking strength, elongation at break and knot strength were 100 kg., 23% and 60 kg. respectively. Another band which was produced under the same conditions but not treated by compression rollers showed a knot strength of only 20 kg.

What is claimed is:

1. An elongated strapping band having high tensile strength and resistance to longitudinal splitting, said band being formed as an extrusion of a thermoplastic resin comprising polypropylene, the interior portion of said band throughout its length having uniaxial orientation in a direction longitudinally of said band to provide the high tensile strength, such orientation having been effected by stretching the band to about 5 to 8 times its extruded length whereby the entire band throughout its length initially has uniaxial orientation, and a surface portion of said band throughout its length having biaxial orientation to provide the resistance to longitudinal splitting, the biaxial orientation having been effected by applying transverse force of sufficient magnitude to said surface portion to permanently change the initial uniaxial orientation thereat to biaxial orientation.

2. The strapping band according to claim 1, wherein the pressure applied to said surface portion results in a multitude of small compressed parts throughout the entire length of said surface portion, the thickness of the compressed parts being significantly different from that of the uncompressed parts.

3. The strapping band according to claim 1, wherein the pressure applied to said surface portion results in closely spaced permanent indentations cross-wise thereof throughout its length, said indentations providing the biaxial orientation at such surface portion, whereby said interior portion with uniaxial orientation combines with said surface portion with biaxial orientation to provide said band with high tensile strength and resistance to longitudinal splitting.

4. The band specified in claim 3, wherein said indentations provide a scabrous band surface that resist slipping thereover.

References Cited

UNITED STATES PATENTS

| | | | |
|---|---|---|---|
| 2,689,378 | 9/1954 | Muth et al. | 264—288 |
| 3,283,378 | 11/1966 | Crampton | 260—897 A |
| 3,214,503 | 10/1965 | Markwood | 264—288 |
| 3,060,515 | 10/1962 | Corbett | 264—284 |
| 3,281,501 | 10/1966 | Coats et al. | 260—897 A |
| 3,372,049 | 3/1968 | Schaffhausen | 264—289 |

HAROLD ANSHER, Primary Examiner

J. J. BELL, Assistant Examiner

U.S. Cl. X.R.

24—16 R; 161—164, 180, 402; 264—210, 293

UNITED STATES PATENT OFFICE
CERTIFICATE OF CORRECTION

PATENT NO. : 3,746,608
DATED : July 17, 1973
INVENTOR(S) : Mitsuhiro TAKAHASHI

It is certified that error appears in the above-identified patent and that said Letters Patent are hereby corrected as shown below:

Column 1, line 6, change "Nitto Boseki Co., Ltd., Fukushima-shi, Japan" to -- To Ube-Nitto Kasei, Co., Ltd., Tokyo, Japan by mesne assignment --.

Signed and Sealed this second Day of December 1975

[SEAL]

Attest:

RUTH C. MASON
*Attesting Officer*

C. MARSHALL DANN
*Commissioner of Patents and Trademarks*